United States Patent
Datcuk, Jr.

(10) Patent No.: US 6,860,442 B2
(45) Date of Patent: *Mar. 1, 2005

(54) LOCKING PRESET KNOB FOR FISHING REEL

(75) Inventor: Peter T. Datcuk, Jr., Sewell, NJ (US)

(73) Assignee: Penn Fishing Tackle Manufacturing Co., Philadelphia, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/622,345

(22) Filed: Jul. 19, 2003

(65) Prior Publication Data

US 2005/0011977 A1 Jan. 20, 2005

(51) Int. Cl.⁷ .............................................. A01K 89/02
(52) U.S. Cl. ........................................ 242/244; 242/285
(58) Field of Search ................................ 242/244–246, 242/302–304

(56) References Cited

U.S. PATENT DOCUMENTS

| | | | | | |
|---|---|---|---|---|---|
| 4,371,354 A | * | 2/1983 | McKean | ........................ | 464/36 |
| 4,548,305 A | * | 10/1985 | Anderson | ................ | 192/56.54 |
| 5,007,602 A | * | 4/1991 | Carlsson | ...................... | 242/246 |
| 5,575,432 A | * | 11/1996 | Baisch | ........................ | 242/302 |
| 5,863,007 A | * | 1/1999 | Sato | ........................... | 242/264 |
| 5,896,968 A | * | 4/1999 | Bruntz | .................... | 192/56.57 |
| 6,364,228 B1 | * | 4/2002 | Datcuk, Jr. | ................ | 242/244 |
| 6,578,785 B1 | * | 6/2003 | Hong | ......................... | 242/245 |

* cited by examiner

Primary Examiner—Emmanuel Marcelo
(74) Attorney, Agent, or Firm—Frank J. Benasutti

(57) ABSTRACT

A locking preset mechanism for a fishing reel is provided by interlocking balls in the preset knob face and the depressions in the mating face of an axially moveable force transmitting means in the mechanism. In free spool, the knob can be rotated. In drag, the knob is locked against rotation.

4 Claims, 4 Drawing Sheets

LOCKING PRESET KNOB FOR FISHING REEL

BACKGROUND OF THE INVENTION

1. Field of the Invention

This invention relates to fishing reels and, in particular, to a mechanism for locking the preset knob which controls the drag mechanism of the reel.

2. Description of the Prior Art

In the prior art, it is common to have drag mechanisms on fishing reels. One type of reel is known as a lever drag reel. In a conventional lever drag reel, a lever is used to vary the amount of drag force on the spool. There is usually a stop called "strike", another stop called "full", and a final stop called "free". At the free stop, the spool is in "free spool", or in other words, there is no drag on the spool. At the "strike" stop, the reel is providing a drag of approximately ⅓ the breaking strength of the line. At the "full" stop, the reel provides a drag of approximately ½ the breaking strength of the line.

Most reels are designed to be fished with various weight lines. Thus some method of adjustment is needed to vary the drag values at the "strike" and "full" positions. This is done through a preset adjustment system. All conventional lever drag reels have a preset adjustment system; which usually includes a set of threaded members. It is very important that the preset doesn't change unless the user wishes it to. Vibration, mishandling and simply operation of the reel can knock the preset out of adjustment. Thus a locking preset is desirable.

In the prior art, there are many systems that lock the preset knob to prevent its rotation. All of these designs require some manipulation of the reel, such as pushing a button and turning a knob, to adjust the preset. This can be difficult to accomplish on a moving boat with wet and slimy hands. My design avoids these problems.

U.S. Pat. No. 5,863,007 describes a drag mechanism for a spinning reel. The locking preset mechanism is not a drag mechanism, but a means to prevent the accidental rotation of the preset knob during use of the reel.

U.S. Pat. No. 5,219,131 shows an electronic drag monitoring system. In the section view FIG. 1, a cam member "C" is shown. This member is nothing more than a cam or follower that is used in any conventional lever drag reel.

U.S. Pat. No. 3,184,179 uses a standard thumbnut to adjust the preset, as described in column 4, line 25–35. This patent discloses a basic lever drag reel design.

U.S. Pat. No. 4,871,129 is an alternative lever drag design. It has no provisions for preventing the preset knob from rotating accidentally while the reel is in use.

U.S. Pat. No. 4,852,826 shows yet another lever drag fishing reel design. This reel uses a rubber o-ring (not called out, between items 30 and 32 in FIG. 1) to retard the rotation of the preset knob. It does not preclude the rotation of the preset knob when the reel is in use, nor does it allow easy adjustment of the knob when the drag lever is in the free spool position. This is due to the friction between the rubber o-ring and the preset knob.

U.S. Pat. No. 5,601,245 shows yet another lever drag reel design. This design uses a lever rather than a knob to adjust preset. As such, it makes no provision to prevent movement of the preset lever under drag; other than the friction between the various members. The same applies to U.S. Pat. No. 4,516,741.

U.S. Pat. No. 5,560,562 shows an unusual lever drag reel. This reel has no preset adjustment. It uses a threaded pair in place of a cam and follower. Since it has no preset system, it has no provisions for a locking preset system.

The reel pictured in U.S. Pat. No. 5,297,756 uses the same preset knob mechanism as shown in U.S. Pat. No. 4,852,826. The same comments apply.

My prior U.S. Pat. No. 6,364,228 discloses a locking preset mechanism for a fishing reel provided by interlocking serrations in the preset knob face and the mating face of an axially moveable force transmitting means in the mechanism. In free spool, the knob can be rotated. In drag, the knob is locked against rotation.

SUMMARY OF THE INVENTION

To eliminate the accidental loosening of the preset knob, I have provided a mechanism for locking the preset knob while the reel is in a drag producing state and permitting the easy rotation of the preset knob when the reel is in the free spool condition.

More particularly, I provide in a fishing reel having a drag mechanism capable of being moved to a drag condition and to a free spool condition, and having the force exerted by said drag mechanism pre-set by turning a knob, the improvement comprising a locking means to prevent said knob from accidentally turning during use of said reel, said locking means comprising a radial surface on said knob having balls retained in and extending therefrom; a transmitting member juxtaposed to said knob and having a radial surface in opposed relation to the radial surface on said knob; and said radial surface on said transmitting member having depressions therein such that when said depressions are engaged with said balls and when the drag lever is moved to said free spool condition, said knob can be easily rotated, or when said reel is in a drag producing condition, said knob is in a locked non-rotating condition.

DESCRIPTION OF THE PREFERRED EMBODIMENTS

Figure 1:
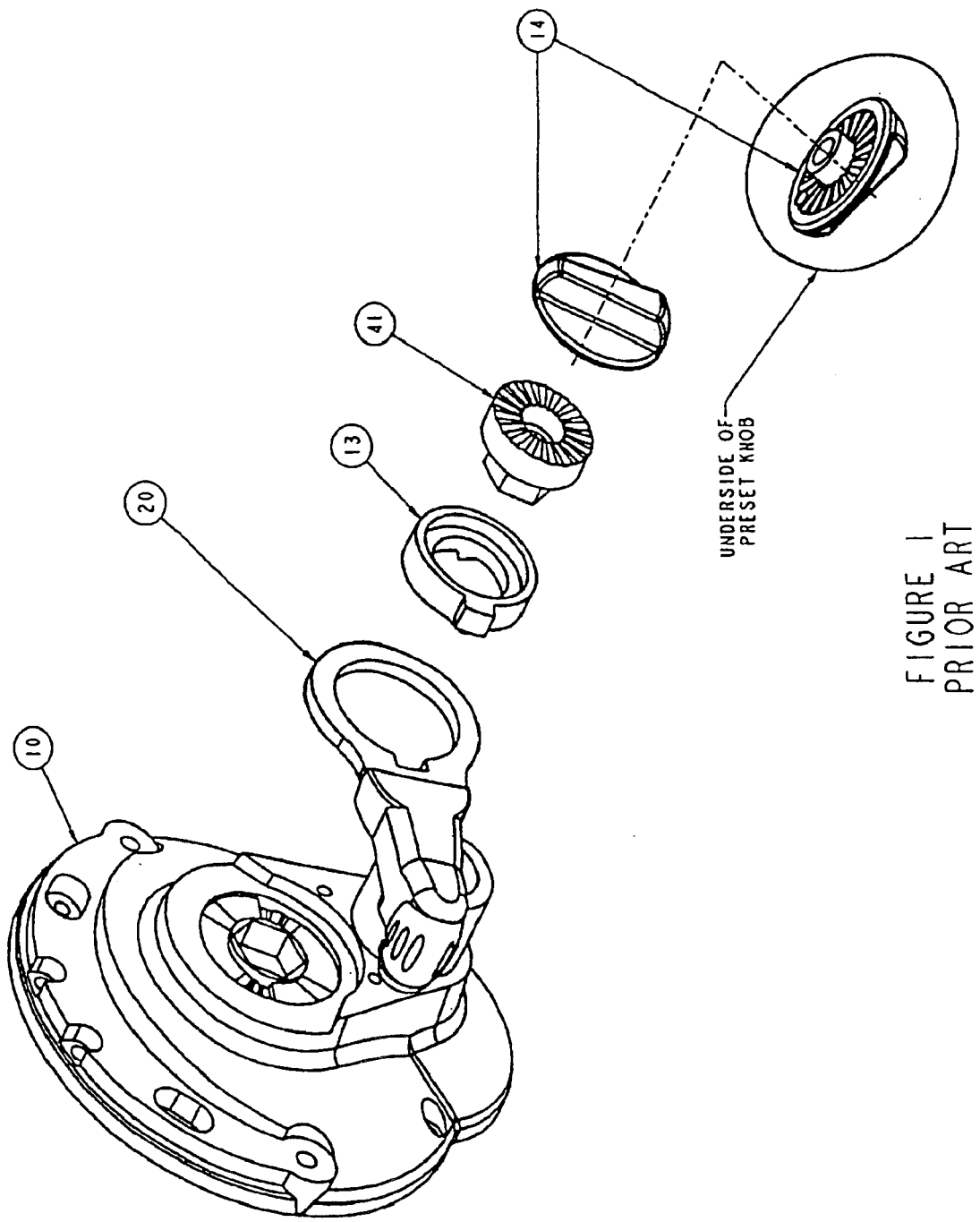
FIG. 1 is an expanded perspective view of portions of a fishing reel showing a mechanism in accordance with my prior art U.S. Pat. No. 6,364,228.

Referring to the Figures in the prior art as shown in FIG. 1, the preset of the drag is accomplished when the drag lever (20) is at the free spool position. The drag lever (20) is keyed to the cam (13). In my design, there is a transmitting member (41) that is keyed to the right side plate (10) of the reel to prevent rotation, while being allowed to move axially. This member transmits the axial motion of the cam to the preset knob (14). This transmitting member (41) has a series of serrations on the surface that contact mating set of serrations on the preset knob (14).

Figure 2:
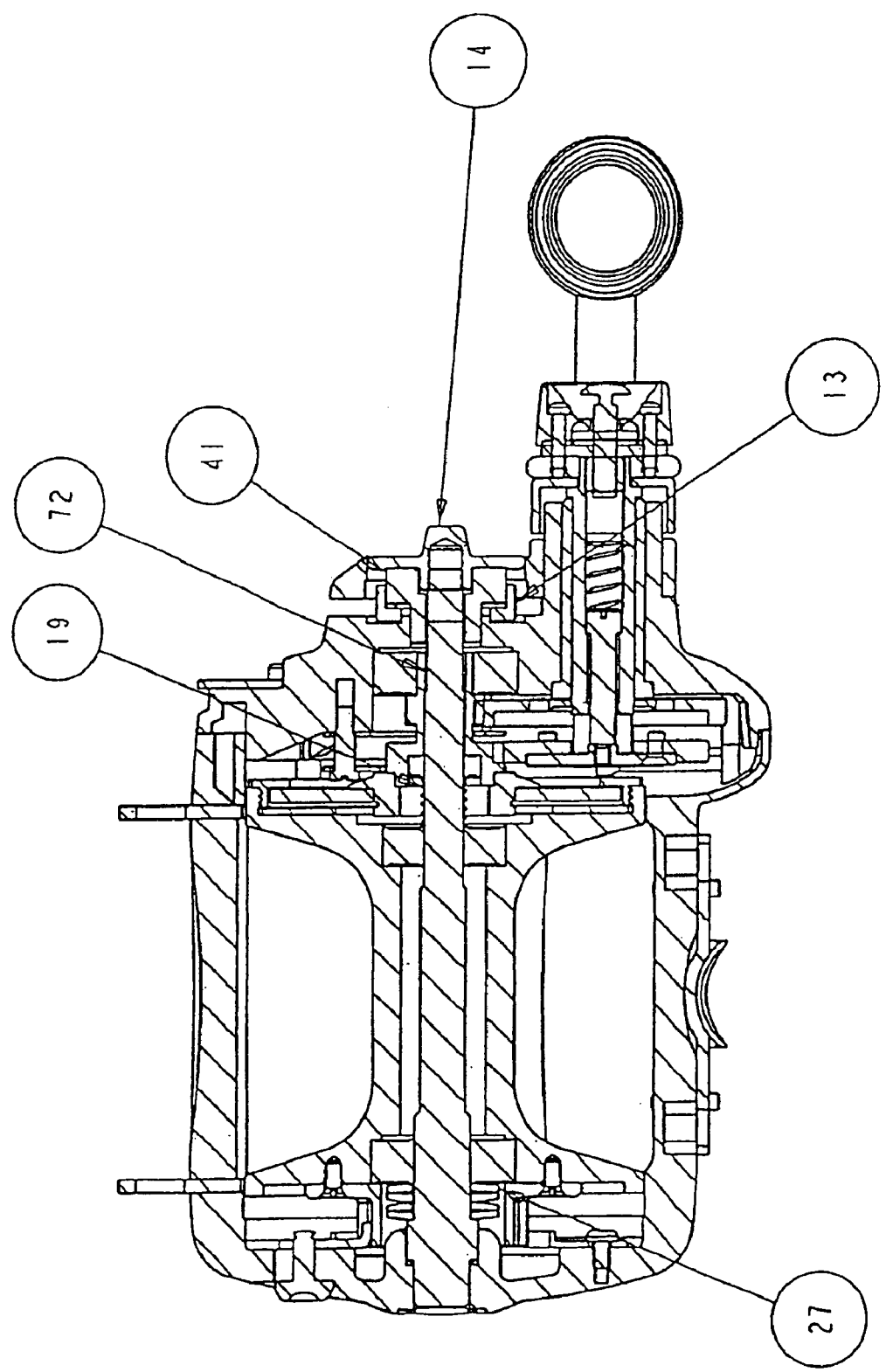
FIG. 2 is a section of a fishing reel also showing the parts of my prior art patent as shown in FIG. 1, assembled.

The preset knob (14) and the transmitting member (41) are kept in contact with one another either by the Belleville springs (27 FIG. 2), or the drag member separation spring (19 FIG. 2), depending on the position of the drag lever (20).

When the drag lever (20) is in the free spool condition, the Belleville springs (27) are exerting no force in the reel. Only the drag member separation spring (19) is exerting any axial force. This spring keeps the serrated surfaces of the preset knob (14) and the transmitting member (41) in contact, but its axial force is much lighter than that of the Belleville springs (27). The serrations combined with the light axial force of the drag member separation spring (19) provide slight resistance to rotation of the preset knob (14). When the user turns the preset knob (14), this axial force is overcome by the camming action of the mating serrations on the preset knob (14) and the transmitting member (41). The serrations will ride up and over one another, thus allowing rotation of the knob.

When the drag lever (20) is in any other position (other than free spool), the bulk of the axial forces in the reel are created by the Belleville springs (27). These axial forces are much greater than those caused by the drag member separation spring (19). If the user tries to turn the preset knob (14), the cam action of the serrations will not provide enough mechanical advantage for the user to overcome the axial force of the Belleville springs (27) and thus the serrations will not be able to ride up and over one another. The preset knob (14) is now "locked" and thus prevents accidental rotation.

Figure 3:
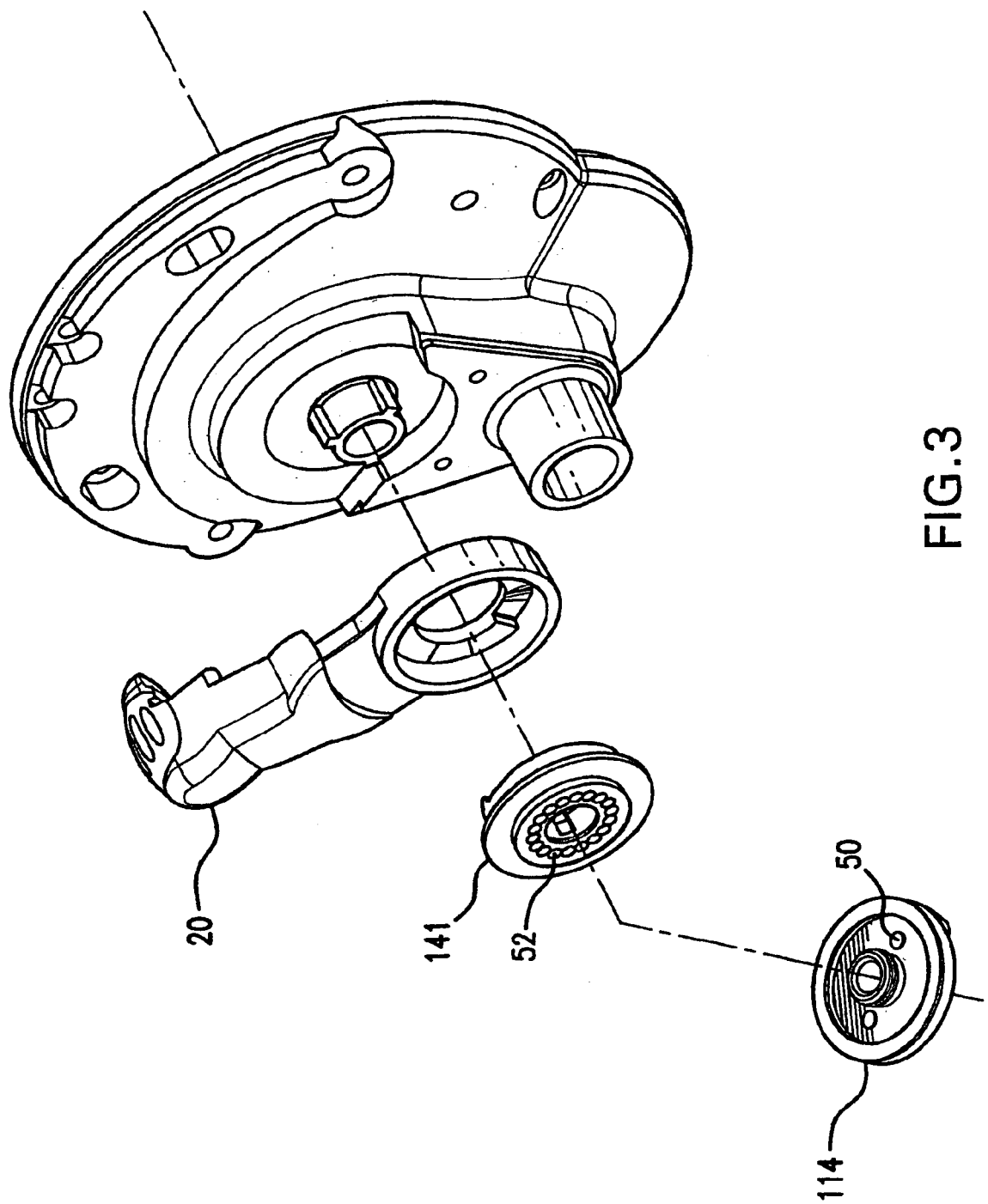
FIG. 3 is an expanded perspective view of portions of a fishing reel showing a mechanism in accordance with the present invention.
Figure 4:
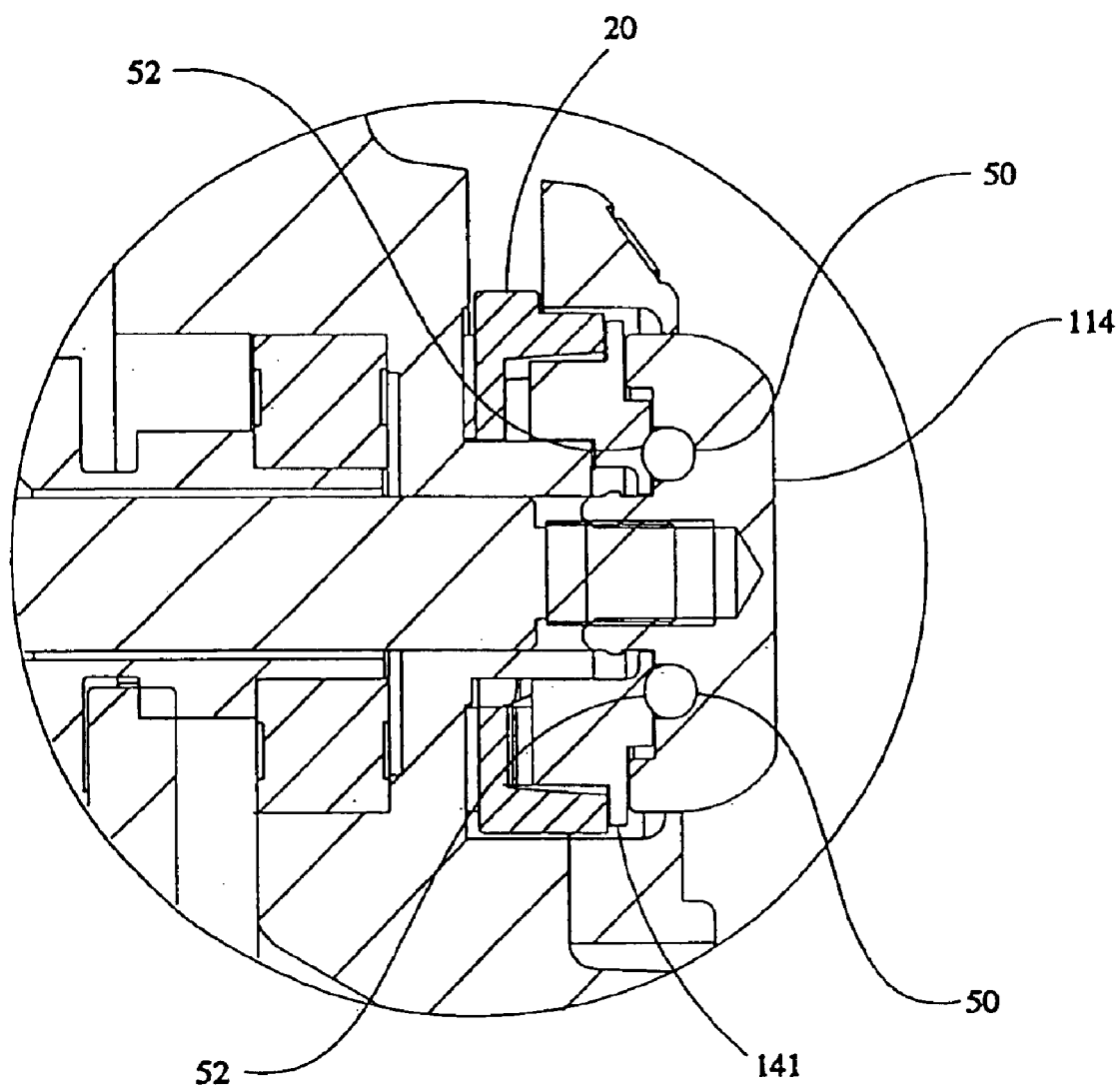
FIG. 4 is a section of a fishing reel also showing the parts in FIG. 3, assembled.

The present invention is different from the invention shown in U.S. Pat. No. 6,364,228. In this device, I provide a pair of balls 50, FIGS. 3 and 4, staked into the preset knob. On the mating piece, the serrations can remain, or most preferably are replaced by a series of spherical depressions 52 into which the balls in the preset knob rest. The operation is identical to the patent. Referring to the Figures, the preset of the drag is accomplished when the drag lever 20 is at the free spool position. The drag lever 20 is keyed to the cam 13. In my design, there is a transmitting member 141 that is keyed to the right side plate 10 of the reel to prevent rotation, while being allowed to move axially. This member transmits the axial motion of the cam to the preset knob 14. This transmitting member 141 has a series of depressions on the surface that contact mating set of balls on the preset knob 114.

The preset knob 114 contains two balls 50, which are staked into pockets machined in the knob. Alternatively, molded bosses or the like could replace the balls in function. The transmitting member 141 contains a series of spherical depressions 52. The preset knob 114 and the transmitting member 141 are kept in contact with one another either by the Belleville springs 27, FIG. 2, or the drag member separation spring 19, FIG. 2, depending on the position of the drag lever 20.

When the drag lever 20 is in the free spool condition, the Belleville springs 27 are exerting no force in the reel. Only the drag member separation spring 19 is exerting any axial force. This spring keeps the balls 50 in the preset knob 114 and the spherical depressions 52 in the transmitting member 141 in contact, but is axial force is much lighter than that of the Belleville springs 27. The balls 50 and depressions 52 combined with the light axial force of the drag member separation spring 19 provide slight resistance to rotation of the preset knob 114. When the user turns the present knob 114, this axial force is overcome by a camming action of the mating surfaces of the preset knob 114 and the transmitting member 141. The balls 50 will ride out of the depressions 52, thus allowing rotation of the knob.

When the drag lever 20 is in any other position (other than free spool), the bulk of the axial forces in the reel are created by the Belleville springs 27. These axial forces are much greater than those caused by the drag member separation spring 19. If the user tries to turn the preset knob 114, the cam action of the balls and depressions will not provide enough mechanical advantage for the user to overcome the axial force of the Belleville springs 27 and thus the balls 50 will not be able to ride out of the depressions 52. The preset knob 114 is now "locked", thus preventing accidental rotation.

Thus, it can be seen that the locking of the preset knob is automatic. When the drag lever is moved to the free spool position, the preset knob is automatically unlocked and free to be rotated. When the drag lever is moved out of the free spool position, the preset knob is automatically locked and further rotation of the knob is prevented.

What is claimed is:

1. In a fishing reel having a drag mechanism capable of being moved to a drag condition and to a free spool condition, and having the force exerted by said drag mechanism pre-set by turning a knob, the improvement comprising:

a locking means to prevent said knob from accidentally turning during use of said reel, said locking means comprising: a radial surface on said knob; said radial surface having balls retained therein and extending therefrom; a transmitting means juxtaposed to said knob and having a radial surface in opposed relation to the radial surface on said knob; said transmitting means radial surface having depressions therein such that when said balls are engaged with said depressions and when the drag lever is moved to said free spool condition, said knob can be easily rotated, or when said reel is in a drag producing condition, said knob is in a locked non-rotating condition.

2. The reel of claim 1, wherein said reel further comprises at least two spring means capable of applying different axial forces to said transmitting means to force said transmitting means into engagement with said knob.

3. The reel of claim 2 wherein the axial force exerted by one of said spring means when said reel is in said free spool condition is such that the balls and depressions are maintained in contact with one another, while permitting rotation of said knob.

4. The reel of claim 2 wherein the axial force exerted by the other of said spring means when said reel is in said drag condition is such that the balls and depressions are maintained in contact with one another, while preventing rotation of said knob.

* * * * *